(12) United States Patent
Kwon et al.

(10) Patent No.: US 10,793,929 B2
(45) Date of Patent: Oct. 6, 2020

(54) GRAIN-ORIENTED ELECTRICAL STEEL SHEET AND METHOD FOR MANUFACTURING SAME

(71) Applicant: POSCO, Pohang-si, Gyeongsangbuk-do (KR)

(72) Inventors: Oh Yeoul Kwon, Pohang-si (KR); Sun Mi Shin, Pohang-si (KR); Chang Ho Moon, Pohang-si (KR); Won Gul Lee, Pohang-si (KR)

(73) Assignee: POSCO, Pohang-si, Gyeongsangduk-do (KR)

( * ) Notice: Subject to any disclaimer, the term of this patent is extended or adjusted under 35 U.S.C. 154(b) by 847 days.

(21) Appl. No.: 14/907,046

(22) PCT Filed: Jul. 22, 2014

(86) PCT No.: PCT/KR2014/006638
§ 371 (c)(1),
(2) Date: Jan. 22, 2016

(87) PCT Pub. No.: WO2015/012562
PCT Pub. Date: Jan. 29, 2015

(65) Prior Publication Data
US 2016/0177413 A1    Jun. 23, 2016

(30) Foreign Application Priority Data

Jul. 24, 2013 (KR) .................. 10-2013-0087416

(51) Int. Cl.
*C21D 9/46* (2006.01)
*C22C 38/02* (2006.01)
(Continued)

(52) U.S. Cl.
CPC .................. *C21D 9/46* (2013.01); *B21B 1/22* (2013.01); *B23K 26/362* (2013.01); *B23K 26/40* (2013.01);
(Continued)

(58) Field of Classification Search
CPC .... B23K 26/362; C21D 6/008; C21D 8/0205; C21D 8/0247; C21D 8/0294;
(Continued)

(56) References Cited

U.S. PATENT DOCUMENTS 4,863,531 A * 9/1989 Wada .................. C21D 8/1294
148/111
9,139,886 B2 * 9/2015 Sakai .................. C21D 8/1294
(Continued)

FOREIGN PATENT DOCUMENTS

EP    0589418 A1    3/1994
JP    07-040527 B2    5/1994
(Continued)

OTHER PUBLICATIONS

International Search Report dated Sep. 22, 2014 issued in International Patent Application No. PCT/KR2014/006638 (English translation).
(Continued)

*Primary Examiner* — Jie Yang
(74) *Attorney, Agent, or Firm* — Morgan, Lewis & Bockius LLP (57) ABSTRACT

Disclosed are a grain-oriented electrical steel sheet and a method of manufacturing the same. The method for manufacturing a grain-orientated electrical steel sheet according to an exemplary embodiment of the present invention includes: providing an electrical steel sheet before forming primary recrystallization or after forming the primary recrystallization; and forming a groove in a surface of the
(Continued)

electrical steel sheet by radiating laser and simultaneously spraying gas onto the electrical steel sheet, in which energy density $E_d$ and a laser scanning speed $V_s$ of the radiated laser satisfy the following conditions, $1.0 \text{ J/mm}^2 \leq E_d \leq 5.0 \text{ J/mm}^2$, $0.0518 \text{ mm/}\mu\text{sec} \leq V_s \leq 0.2 \text{ mm/}\mu\text{sec}$.

17 Claims, 3 Drawing Sheets

(51) Int. Cl.
| | |
|---|---|
| *B21B 1/22* | (2006.01) |
| *C22C 38/00* | (2006.01) |
| *C21D 8/12* | (2006.01) |
| *B23K 26/362* | (2014.01) |
| *B23K 26/40* | (2014.01) |
| *C21D 6/00* | (2006.01) |
| *C21D 8/02* | (2006.01) |
| *B23K 103/04* | (2006.01) |
| *C21D 10/00* | (2006.01) |

(52) U.S. Cl.
CPC .......... *C21D 6/008* (2013.01); *C21D 8/0205* (2013.01); *C21D 8/0247* (2013.01); *C21D 8/0294* (2013.01); *C21D 8/1294* (2013.01); *C22C 38/00* (2013.01); *C22C 38/02* (2013.01); *B23K 2103/04* (2018.08); *C21D 8/1277* (2013.01); *C21D 10/00* (2013.01)

(58) Field of Classification Search
CPC ...... C21D 8/1277; C21D 8/1294; C21D 9/46; C22C 38/02; H10F 1/16
See application file for complete search history.

(56) References Cited

U.S. PATENT DOCUMENTS

| | | | |
|---|---|---|---|
| 2002/0157734 A1 | 10/2002 | Senda et al. | |
| 2013/0017408 A1* | 1/2013 | Sakai | C21D 8/1294 428/600 |
| 2013/0139932 A1 | 6/2013 | Sakai et al. | |
| 2013/0160901 A1 | 6/2013 | Omura et al. | |
| 2014/0374137 A1* | 12/2014 | Kwon | C21D 8/1288 174/126.3 |
| 2015/0059932 A1* | 3/2015 | Hirano | C21D 8/12 148/306 |

FOREIGN PATENT DOCUMENTS

| | | | |
|---|---|---|---|
| JP | 2002-292484 A | 10/2002 | |
| JP | 4593678 B2 | 12/2010 | |
| JP | 4616623 B2 | 1/2011 | |
| JP | 4782248 B1 | 9/2011 | |
| JP | 2012-087332 A | 5/2012 | |
| JP | 5229432 B1 | 7/2013 | |
| KR | 1994-0005812 A | 3/1994 | |
| KR | 10-2013-0043232 A | 4/2013 | |
| WO | WO-2011125672 A1 * | 10/2011 | .......... C21D 8/1294 |
| WO | 2013-094777 A1 | 6/2013 | |
| WO | 2013/100353 A1 | 7/2013 | |

OTHER PUBLICATIONS

Korean Office Action dated Aug. 21, 2020 issued in Korean Patent Application No. 10-2014-0092366.

* cited by examiner

GRAIN-ORIENTED ELECTRICAL STEEL SHEET AND METHOD FOR MANUFACTURING SAME

RELATED APPLICATIONS

This application is the U.S. National Phase under 35 U.S.C. § 371 of International Application No. PCT/KR2014/006638, filed on Jul. 22, 2014, which in turn claims the benefit of Korean Application No. 10-2013-0087416, filed on Jul. 24, 2013, the disclosures of which Applications are incorporated by reference herein.

TECHNICAL FIELD

The present invention relates to a grain-oriented electrical steel sheet and a method of manufacturing the same.

BACKGROUND ART

A grain-oriented electrical steel sheet is used as a material for an iron core of an electrical device such as an electric transformer, and a steel sheet, which has magnetic characteristics with low core loss and high magnetic flux density, is required to reduce a loss of electric power of the electrical device and improve efficiency.

In general, the grain-oriented electrical steel sheet refers to a material having a texture (so-called "Goss texture") oriented in a rolling direction, a {110}<001> direction through hot rolling, cold rolling, and annealing processes.

In the case of the grain-oriented electrical steel sheet, the more greatly the {110}<001> direction is oriented in an easy magnetization axis direction of iron, the better the magnetic characteristics is achieved.

In general, the grain-oriented electrical steel sheet is manufactured by allowing a slab, which is manufactured by a continuous casting process, to be subjected to hot rolling, hot rolled plate annealing, cold rolling, decarburizing annealing, high temperature annealing, planarization annealing, insulation coating, and laser treatment processes in sequence.

To form uniform grooves 20 in a surface of an electrical steel sheet 10, it is necessary to radiate continuous high power laser to the surface of the high-speed electrical steel sheet 10, and form the grooves 20 with accompanying melting of a base portion caused by the radiation of the laser.

A method of refining magnetic domains is used to improve magnetic characteristics of the grain-oriented electrical steel sheet, and the magnetic domain refinement method may be classified into a temporary magnetic domain refinement method and a permanent magnetic domain refinement method in accordance with whether an effect of improving magnetic domain refinement is maintained even after stress removing annealing.

The temporary magnetic domain refinement method is a magnetic domain refinement technology that refines the magnetic domain by forming a 90° magnetic domain in order to minimize magnetic elastic energy generated by exerting local compressive stress on the surface using thermal energy or mechanical energy.

The temporary magnetic domain refinement technology is classified into a laser magnetic domain refinement method, a ball scratch method, and a magnetic domain refinement method using plasma or ultrasonic wave in accordance with an energy source for refining the magnetic domain.

The permanent magnetic domain refinement method, which may maintain an effect of improving a core loss even after heat treatment, may be classified into an etching method, a roll method, and a laser method.

The etching method forms a groove in a surface of the steel sheet by an electrochemical corrosion reaction caused by an acid solution in a solution, and as a result, the etching method has drawbacks in that it is difficult to control a shape of the groove, it is difficult to ensure core loss characteristics of a final product because the groove is formed during an intermediate process (before decarburizing annealing and high temperature annealing) for producing the steel sheet, and this method is not environmentally friendly because the acid solution is used.

The permanent magnetic domain refinement method using a roll is a magnetic domain refinement technology that forms a groove having predetermined width and depth in the surface of the steel sheet by processing a protrusion shape on the roll and using a pressing method, and generates recrystallization at a lower portion of the groove by annealing the steel sheet after forming the groove, but has drawbacks in that reliability is low such that it is difficult to ensure machining stability and stable core loss according to a thickness, and processes are complicated.

The permanent magnetic domain refinement method using Q-Switch or pulse laser forms a groove by evaporation of a material at an irradiated portion at the time of irradiation, but has drawbacks in that it is difficult to ensure a core loss improvement rate immediately after forming the groove and before heat treatment, only a magnetic domain refinement effect caused by the simple groove is maintained even after the heat treatment, and a conveying speed of the steel sheet cannot be increased to a high speed.

The permanent magnetic domain refinement method using continuous wave laser forms a resolidification layer only on a sidewall of the groove at the time of forming the groove, or cannot uniformly form the resolidification layer on the entire surface of the groove, such that excessive deformation is maintained at a lower base portion of the groove, and as a result, this method has drawbacks in that this method is difficult to be applied to a process before primary recrystallization, and is applied only to an iron core for a wound core electric transformer which is required to be subjected to heat treatment.

Figure 1:
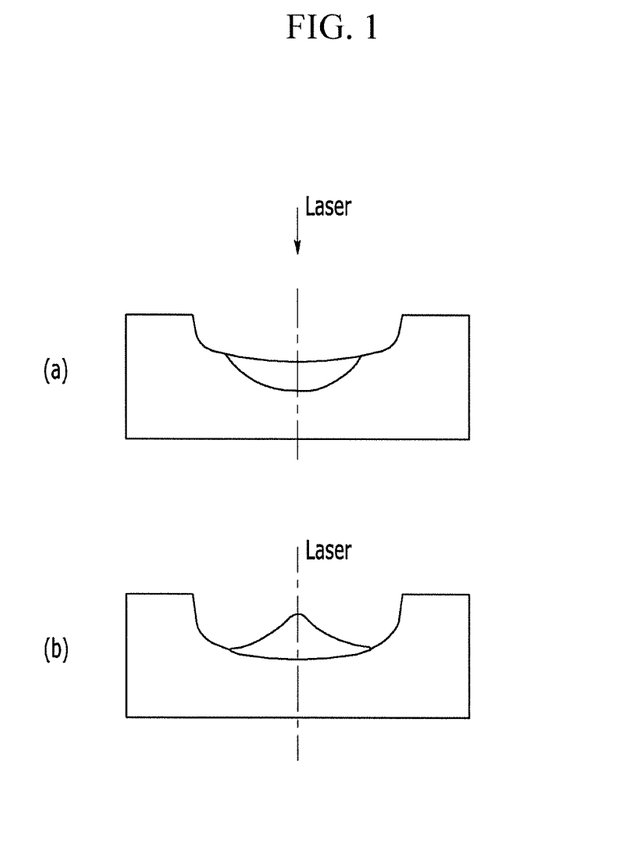
FIG. 1 is a view illustrating a groove formed in a surface of a steel sheet by a magnetic domain refinement method according to the related art.

FIG. 1 illustrates a cross-sectional shape of a groove at the time of forming an excessively melted portion and a non-uniform resolidification layer. A technology, which forms an excessively melted portion (a) at a lower side in the groove and a central portion (b) of the resolidification layer, forms the groove in the steel sheet at a relatively low speed, and as a result, this technology has drawbacks in that it is difficult to form a groove in a surface of a grain-oriented electrical steel sheet surface which moves at a high speed of 0.9 m/s or higher, this technology cannot be applied to a material for the grain-oriented electrical steel sheet before primary recrystallization, and the resolidification layer may hinder a growth of the Goss texture at the time of annealing.

DISCLOSURE

Technical Problem

An exemplary embodiment of the present invention has been made in an effort to provide a grain-oriented electrical steel sheet which has a surface formed with grooves to refine a magnetic domain.

Another exemplary embodiment of the present invention provides a method of manufacturing a grain-oriented electrical steel sheet, which has a surface formed with grooves to refine a magnetic domain.

Technical Solution

The present invention has also been made in an effort to provide a method of manufacturing a grain-oriented electrical steel sheet which has a surface formed with grooves to refine a magnetic domain. An exemplary embodiment of the present invention provides a grain-oriented electrical steel sheet, which has a surface which is formed with grooves for a magnetic domain refinement treatment, in which a scattering alloy layer in the groove is eroded in a Goss texture during a recrystallization annealing process.

When a thickness of the scattering alloy layer on a bottom surface of the groove is defined as $T_B$, and a thickness of the scattering alloy layer at a point that is one-half the distance between any one end of the groove and the bottom surface of the groove is defined as $T_L$, $T_B/T_L$ may be 0.2 to 0.8.

A thickness of the scattering alloy layer may be 4% to 12% of a depth of the groove.

The depth of the groove may be 4% to 11% of a thickness of the electrical steel sheet.

The groove may be formed diagonally with respect to a width direction of the electrical steel sheet.

The groove may be formed at an angle greater than 0° and equal to or smaller than 5° with respect to the width direction of the electrical steel sheet.

Three to six grooves may be intermittently formed in the width direction of the electrical steel sheet.

Another exemplary embodiment of the present invention provides a method of manufacturing a grain-oriented electrical steel sheet, the method including: providing an electrical steel sheet before forming primary recrystallization or after forming the primary recrystallization; and forming a groove in a surface of the electrical steel sheet by radiating laser and simultaneously spraying gas onto the electrical steel sheet, in which energy density $E_d$ and a laser scanning speed $V_s$ of the radiated laser satisfy the following conditions, $1.0\ J/mm^2 \leq Ed \leq 5.0\ J/mm^2$, $0.0518\ mm/\mu sec \leq Vs \leq 0.2\ mm/\mu sec$.

Pressure of the sprayed gas may be 0.2 kg/cm² to 5.0 kg/cm².

An angle formed between the spray direction of the gas and the laser radiation direction may be 0° to 50°.

In the radiating of the laser, a laser beam may be radiated on the surface of the electrical steel sheet at an angle greater than 0° and equal to or smaller than 5° with respect to a width direction of the electrical steel sheet.

In the radiating of the laser, a movement speed $V_L$ of the electrical steel sheet may be at least 0.9 m/s.

In the radiating of the laser, when a beam length in the width direction of the electrical steel sheet is $d_t$, and a beam length in a rolling direction of the electrical steel sheet is L, a light collecting shape of the laser may satisfy the following condition, $0.20 \leq L/d_t \leq 1.0$.

The $d_t$ may be 50 µm or smaller.

In the radiating of the laser, a scattering alloy layer in which a melted portion of the electrical steel sheet by the radiation of the laser scatters and is resolidified may be generated, and when a thickness of the scattering alloy layer on a bottom surface of the groove is defined as TB, and a thickness of the scattering alloy layer at a point that is one-half the a distance between any one end of the groove and the bottom surface of the groove is defined as TL, TB/TL may be 0.2 to 0.8.

A thickness of the scattering alloy layer may be 4% to 12% of a depth of the groove.

In the radiating of the laser, the laser may be radiated diagonally with respect to a width direction of the electrical steel sheet.

In the radiating of the laser, the laser may be radiated at an angle greater than 0° and equal to or smaller than 5° with respect to the width direction of the electrical steel sheet.

In the radiating of the laser, three to six grooves may be intermittently formed in the width direction of the electrical steel sheet.

Advantageous Effects

According to the method of manufacturing the grain-oriented electrical steel sheet according to the exemplary embodiment of the present invention, the groove is formed by radiating a high-speed laser beam, and as a result, it is possible to form a groove in the steel sheet on which rolling is performed at a high speed of 0.9 m/sec or higher.

In addition, according to the method of manufacturing the grain-oriented electrical steel sheet according to the exemplary embodiment of the present invention, a layer melted by the radiation of the laser and resolidified is uniformly formed, thereby improving magnetism of a final product.

In addition, according to the method of manufacturing the grain-oriented electrical steel sheet according to the exemplary embodiment of the present invention, magnetic domain refinement by the radiation of the laser may be performed on the electrical steel sheet before primary recrystallization or after the primary recrystallization.

In addition, according to the method of manufacturing the grain-oriented electrical steel sheet according to the exemplary embodiment of the present invention, even though magnetic domain refinement by the radiation of the laser is performed on the electrical steel sheet before primary recrystallization, an effect of improving a core loss is maintained even after a subsequent heat treatment process.

MODE FOR INVENTION

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Therefore, in some exemplary embodiments, well-known technologies will not be specifically described in order to avoid obscuring the present invention. Unless there are other definitions, all terms used in the present specification (including technical and scientific terms) have the meanings that those having ordinary skill in the technical field to which the present invention pertains typically understand. Unless explicitly described to the contrary, the word "comprise" and variations such as "comprises" or "comprising", will be understood to imply the inclusion of stated elements but not the exclusion of any other elements. In addition, singular expressions used herein may include plural expressions unless they have definitely opposite meanings.

A scattering alloy layer in which a melted portion, which has been melted from an electrical steel sheet by the laser, is resolidified on the steel sheet exists in a groove formed by magnetic domain refinement by radiation of laser.

The scattering alloy layer is a texture having high energy, and in a case in which the scattering alloy layer is non-uniformly distributed, the scattering alloy layer may act as an obstruction factor to a growth a Goss texture at the time of recrystallization annealing. In addition, in a case in which the scattering alloy layer is non-uniformly distributed, the scattering alloy layer is not eroded in the Goss texture at the time of recrystallization annealing, and remains as random texturing instead of the Goss texture, thereby adversely affecting magnetism of the electrical steel sheet.

According to a method of manufacturing a grain-oriented electrical steel sheet according to an exemplary embodiment of the present invention, the scattering alloy layer, which is a layer formed when a melted portion melted from the electrical steel sheet by the radiation of the laser is resolidified on the steel sheet, is uniformly distributed in the groove, and as a result, the scattering alloy layer is eroded in the Goss texture at the time of recrystallization annealing, such that a fraction of the Goss texture is improved, thereby providing a grain-oriented electrical steel sheet having excellent magnetism.

In general, a manufacturing process of the grain-oriented electrical steel sheet is performed by allowing a slab to be subjected to hot rolling, hot rolled plate annealing, cold rolling, decarburizing annealing (primary recrystallization annealing), high temperature annealing (secondary recrystallization annealing), planarization annealing, insulation coating in sequence.

The magnetic domain refinement treatment in the related art is performed after the insulation coating, but according to the method of manufacturing the grain-oriented electrical steel sheet according to the exemplary embodiment of the present invention, after cold rolling, before primary recrystallization or after the primary recrystallization, the magnetic domain refinement may be performed by radiating the laser to the electrical steel sheet.

In addition, even though the magnetic domain refinement is performed by radiating the laser to the electrical steel sheet before the primary recrystallization, an effect of improving a core loss is maintained even after a subsequent heat treatment process.

To provide the aforementioned method of manufacturing the grain-oriented electrical steel sheet, the following method of manufacturing the grain-oriented electrical steel sheet may be provided.

The method of manufacturing the grain-oriented electrical steel sheet according to the exemplary embodiment of the present invention includes: providing an electrical steel sheet before forming primary recrystallization or after forming the primary recrystallization; and forming a groove in a surface of the electrical steel sheet by radiating laser and simultaneously spraying gas onto the electrical steel sheet.

Energy density $E_d$ of the radiated laser may be 1.0 J/mm$^2$ to 5.0 J/mm$^2$. In a case in which the laser energy density exceeds 5.0 J/mm$^2$, the melted portion is excessively formed, and as a result, in a final product, the scattering alloy layer is not eroded in the Goss texture, and forms random texturing. In the case of a value of the laser energy density which is less than 1.0 J/mm$^2$, a sufficient groove depth cannot be ensured, and as a result, an effect of improving a core loss cannot be ensured after the heat treatment.

A scanning speed $V_s$ of the radiated laser may be 0.0518 mm/μsec to 0.2 mm/μsec. In a case in which a value of the scanning speed of the laser exceeds 0.2 mm/μsec, the scattering alloy layer is not formed, and as a result, an effect of improving a core loss cannot be ensured. In addition, in a case in which the scanning speed of the laser is lower than 0.0518 mm/μsec, the melted portion is excessively formed, and as a result, in a final product, the scattering alloy layer is not eroded in the Goss texture, and forms random texturing.

The sprayed gas may be air, inert gas, or any type of gas which does not cause oxidation of the electrical steel sheet.

Pressure $P_a$ of the sprayed gas may be 0.2 kg/cm$^2$ to 5.0 kg/cm$^2$. In a case in which the pressure of the sprayed gas is lower than 0.20 kg/cm$^2$, the scattering alloy layer is not formed, and as a result, an effect of improving a core loss cannot be ensured. In addition, in a case in which the pressure of the sprayed gas exceeds 5.0 kg/cm$^2$, the melted portion is excessively formed, and as a result, in a final product, the scattering alloy layer is not eroded in the Goss texture, and forms random texturing.

An angle formed between the spray direction of the gas and the laser radiation direction may be 0° to 50° (in this case, a state in which the angle formed between the spray direction of the gas and the laser radiation direction is 0° means that the spray direction of the gas and the laser radiation direction are parallel to each other). The angle formed between the spray direction of the gas and the laser radiation direction affects a shape of the scattering alloy layer formed. The smaller the angle formed between the spray direction of the gas and the laser radiation direction, the smaller the thickness of the scattering alloy layer on the bottom surface of the groove, and the greater the thickness of the scattering alloy layer at an end of the groove.

Here, the bottom surface of the groove means the deepest portion in the groove formed in the electrical steel sheet.

In addition, a light collecting shape of the laser may be $0.20 \leq L/d_t \leq 1.0$, in which $d_t$ is a beam length in a width direction (x-axis) of the electrical steel sheet, and L is a beam length in a rolling direction (y-axis). In addition, the $d_t$ may be 50 μm or smaller.

In a case in which the $L/d_t$ value exceeds 1.0, a heat-affected zone in the rolling direction is increased, thereby adversely affecting a growth of the Goss texture, and in a case in which the $L/d_t$ is below 0.20, a width of the groove in the rolling direction is narrow, and the melted portion does not scatter, such that it is impossible to ensure a sufficient groove depth.

Under the above condition, a movement speed $V_L$ of the electrical steel sheet 10 may be 0.9 m/s or higher.

In addition, the groove may be intermittently formed by being divided into three to six grooves.

In addition, the laser may be radiated diagonally with respect to the width direction (x-axis) of the electrical steel sheet. In addition, an angle with respect to the width direction (x-axis) may be greater than 0° and equal to or smaller than 5°. Since the laser is diagonally radiated, it is possible to improve magnetism by decreasing a demagnetizing field.

The depth of the groove formed as described above may be equal to or greater than 4% of the thickness of the electrical steel sheet in order to ensure a core loss improvement rate. Alternatively, the depth of the groove may be 4% to 11% of the thickness of the electrical steel sheet.

In addition, an average thickness of the scattering alloy layer may be 4% to 12% of the depth of the groove. In a case in which the average thickness of the scattering alloy layer is below 4% of the depth of the groove, an appropriate groove for improving a core loss is not formed, and in a case in which the average thickness of the scattering alloy layer exceeds 12% of the depth of the groove, the heat-affected zone is increased, which may have an adverse effect on a growth of the Goss texture.

In addition, when a thickness of the scattering alloy layer on the bottom surface of the groove is defined as $T_B$, and a thickness of the scattering alloy layer at a point that is one-half the distance between any one end of the groove and the bottom surface of the groove is defined as $T_L$, $T_B/T_L$ may be 0.2 to 1.5. Alternatively, the $T_B/T_L$ may be 0.2 to 0.8, or 1.0 to 1.5. In a case in which a value of the $T_B/T_L$ is below 0.2, or exceeds 1.5, non-uniformity of the scattering alloy layer is increased, which has an adverse effect on magnetism.

In the case of the electrical steel sheet on which the recrystallization annealing has been performed under the aforementioned magnetic domain refinement condition, the scattering alloy layer may be eroded in the Goss texture during the recrystallization annealing process. In general, at the time of the magnetic domain refinement treatment of the grain-oriented electrical steel sheet, a heat-affected zone is included in the groove, and the heat-affected zone is not eroded in the Goss texture when the Goss texture grows during a high temperature annealing process, and remains in a shape recrystallized along the groove. The texture has an adverse effect on magnetism.

However, the grain-oriented electrical steel sheet according to the exemplary embodiment of the present invention allows the scattering alloy layer to be uniformly distributed, such that a thermal effect is minimized, and as a result, the recrystallized texture does not remain in the groove.

Hereinafter, the present invention will be described in detail with reference to Examples. However, the following Examples are intended for the purpose of illustration of the present invention, and the contents of the present invention are not limited by the following Examples.

Example 1

Figure 2:
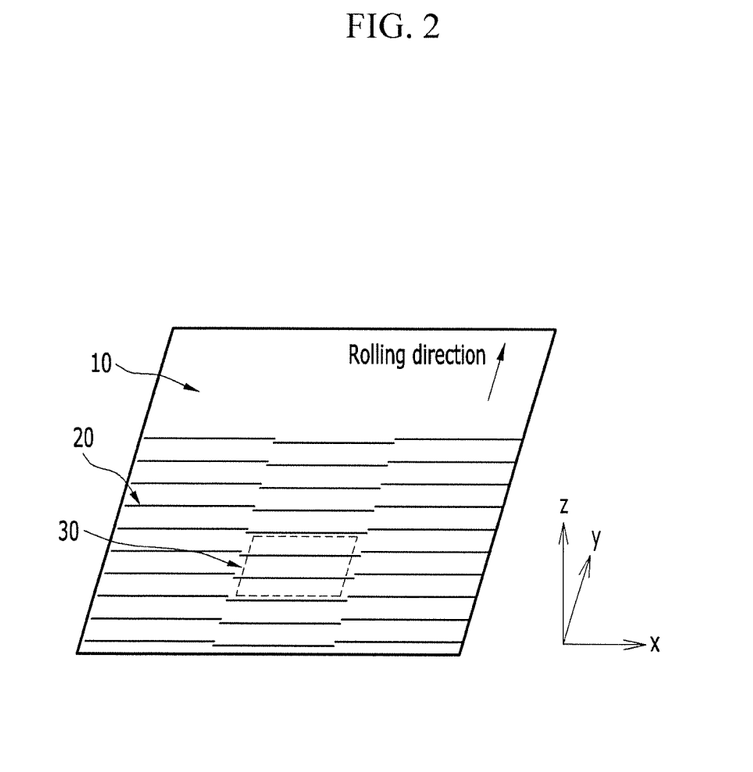
FIG. 2 is a view illustrating shapes of grooves on an XY plane which are formed in a surface of a steel sheet when laser is radiated on the surface of the steel sheet.
Figure 3:
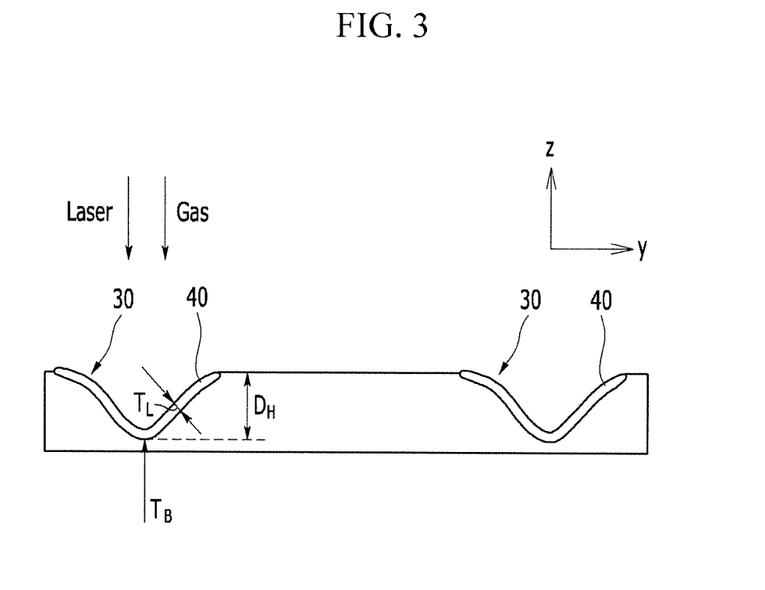
FIG. 3 is a view illustrating a cross section (YZ plane) of a part 30 of the continuous groove illustrated in FIG. 2.

The magnetism was measured by radiating continuous wave laser on the grain-oriented electrical steel sheet having a thickness of 0.23 mm under the condition as disclosed in Table 1. A radiation line is illustrated as a line divided into three to six sections in the width direction as illustrated in FIG. 2. A laser radiation interval was 2.50 mm, and the beam length $d_l$ in the width direction of the electrical steel sheet at the time of radiating the laser was 50 μm and had a spherical shape. In this case, the movement speed of the electrical steel sheet was 0.9 m/s.

TABLE 1

| $E_d$ J/mm² | $D_H$ μm | $T_L/T_B$ | Average thickness of scattering alloy layer μm | Pa Kgf/cm² | Vs m/s | Before radiating laser $W_{17/50}$ | Before heat treatment $W_{17/50}$ | Before heat treatment $W_{17/50}$ | Comparison |
|---|---|---|---|---|---|---|---|---|---|
| 1.0 | 10.0 | 0.3 | 1.2 | 0.2 | 51.8 | 0.82 | 0.78 | 0.78 | Example |
|  | 11.0 | 0.4 | 1.1 | 5.0 | 51.8 | 0.82 | 0.75 | 0.74 | Example |
|  | 6.4 | 0.2 | 0.768 | 5.0 | 200 | 0.82 | 0.79 | 0.79 | Example |
| 5.0 | 21.0 | 0.7 | 1.26 | 0.2 | 51.8 | 0.82 | 0.70 | 0.69 | Example |
|  | 22.2 | 0.8 | 0.9 | 5.0 | 51.8 | 0.82 | 0.71 | 0.71 | Example |
|  | 15.3 | 0.5 | 1.224 | 5.0 | 200 | 0.82 | 0.69 | 0.69 | Example |
| 1.2 | 15 | 0.5 | 0.6 | 61.0 | 51.8 | 0.83 | 0.68 | 0.68 | Example |
|  | 20 | 0.6 | 1.6 |  | 51.8 | 0.82 | 0.67 | 0.67 | Example |
|  | 25 | 0.7 | 3 |  | 200 | 0.83 | 0.68 | 0.67 | Example |
| 5.3 | 25.5 | 0.85 | 1.5 | 5.0 | 51.8 | 0.82 | 0.86 | 0.82 | Comparative Example |
|  |  |  | 1.8 | 5.0 | 51.8 | 0.82 | 0.87 | 0.83 | Comparative Example |
|  |  |  | 0.5 | 5.0 | 200 | 0.82 | 0.85 | 0.83 | Comparative Example |

In the laser radiation condition range according to the present invention, it is possible to provide the grain-oriented electrical steel sheet, which may obtain stable core loss characteristics even at a high movement speed of the steel sheet.

Example 2

The magnetism was measured by setting the energy density to 1.2 J/mm² and the depth of the groove to 15 μm, and by radiating continuous wave laser on the grain-oriented electrical steel sheet having a thickness of 0.23 mm while changing the angle with respect to the width direction of the electrical steel sheet. A laser radiation interval was 2.50 mm, and the beam length $d_l$ in the width direction of the electrical steel sheet at the time of radiating the laser was 50 μm and had a spherical shape. In this case, the movement speed of the electrical steel sheet was 0.9 m/s. In addition, pressure of the sprayed gas was 4.5 kg/cm², and the scanning speed was 53 m/s.

TABLE 2

| Radiation Angle | Not treated by laser core loss (W17/50)/ magnetic flux density B8 | Before heat treatment core loss (W17/50)/ magnetic flux density B8 | After heat treatment core loss (W17/50)/ magnetic flux density B8 | Comparison |
|---|---|---|---|---|
| 0 | 0.82/1.92 | 0.67/1.89 | 0.67/1.90 | Example |
| 3 | 0.83/1.92 | 0.68/1.905 | 0.68/1.910 | Example |
| 5 | 0.82/1.92 | 0.67/1.907 | 0.67/1.915 | Example |
| 7 | 1.07/1.34 | 0.88/1.330 | 0.88/1.330 | Comparative Example |
| 9 | 1.16/1.34 | 0.92/1.320 | 0.92/1.320 | Comparative Example |

As can be seen from Table 2, magnetism is excellent when the laser is radiated at an angle greater than 0° and equal to or smaller than 5° with respect to the width direction of the electrical steel sheet.

The exemplary embodiment of the present invention has been described with reference to the accompanying drawings, but those skilled in the art will understand that the present invention may be implemented in any other specific form without changing the technical spirit or an essential feature thereof.

Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

DESCRIPTION OF REFERENCE NUMERALS

10: Electrical steel sheet
20: Groove
30: Part of continuous groove
40: Scattering alloy layer

The invention claimed is:

1. A grain-oriented electrical steel sheet, which has a surface which is formed with grooves for a magnetic domain refinement treatment,
   wherein a scattering alloy layer in the groove is eroded in a Goss texture during a recrystallization annealing process,
   wherein when a thickness of the scattering alloy layer on a bottom surface of the groove is defined as $T_B$, and a thickness of the scattering alloy layer at a point that is one-half the distance between any one end of the groove and the bottom surface of the groove is defined as $T_L$, $T_B/T_L$ is 0.2 to 0.8, and
   wherein the groove is formed at an angle greater than 0° and equal to or smaller than 5° with respect to the width direction of the electrical steel sheet.

2. The grain-oriented electrical steel sheet of claim 1, wherein:
   a thickness of the scattering alloy layer is 4% to 12% of a depth of the groove.

3. The grain-oriented electrical steel sheet of claim 2, wherein:
   the depth of the groove is 4% to 11% of a thickness of the electrical steel sheet.

4. The grain-oriented electrical steel sheet of claim 3, wherein:
   the groove is formed diagonally with respect to a width direction of the electrical steel sheet.

5. The grain-oriented electrical steel sheet of claim 1, wherein:
   three to six grooves are intermittently formed in the width direction of the electrical steel sheet.

6. A method of manufacturing a grain-oriented electrical steel sheet, the method comprising:
   providing an electrical steel sheet before forming primary recrystallization or after forming the primary recrystallization; and
   forming a groove in a surface of the electrical steel sheet by radiating laser and simultaneously spraying gas onto the electrical steel sheet,
   wherein energy density $E_d$ and a laser scanning speed $V_s$ of the radiated laser satisfy the following conditions, $$1.0 \text{ J/mm}^2 \leq E_d \leq 5.0 \text{ J/mm}^2,$$

$$0.0518 \text{ mm/}\mu\text{sec} \leq V_s \leq 0.2 \text{ mm/}\mu\text{sec},$$

wherein a scattering alloy layer in the groove is eroded in a Goss texture during a recrystallization annealing process, and
wherein when a thickness of the scattering alloy layer on a bottom surface of the groove is defined as $T_B$, and a thickness of the scattering alloy layer at a point that is one-half the distance between any one end of the groove and the bottom surface of the groove is defined as $T_L$, $T_B/T_L$ is 0.2 to 0.8, and
wherein the groove is formed at an angel greater than 0° and equal to or smaller than 5° with respect to the width direction of the electrical steel sheet.

7. The method of claim 6, wherein:
pressure of the sprayed gas is 0.2 kg/cm² to 5.0 kg/cm².

8. The method of claim 7, wherein:
an angle formed between the spray direction of the gas and the laser radiation direction is 0° to 50° (here, a state in which the angle formed between the spray direction of the gas and the laser radiation direction is 0° means that the spray direction of the gas and the laser radiation direction are parallel to each other).

9. The method of claim 8, wherein:
in the radiating of the laser, a laser beam is radiated on the surface of the electrical steel sheet at an angle greater than 0° and equal to or smaller than 5° with respect to a width direction of the electrical steel sheet.

10. The method of claim 9, wherein:
in the radiating of the laser, a movement speed $V_L$ of the electrical steel sheet is at least 0.9 m/s.

11. The method of claim 10, wherein:
in the radiating of the laser,
when a beam length in the width direction of the electrical steel sheet is $d_t$, and a beam length in a rolling direction of the electrical steel sheet is L, a light collecting shape of the laser satisfies the following condition, $$0.20 \leq L/d_t \leq 1.0.$$

12. The method of claim 11, wherein:
$d_t$ is 50 μm or smaller.

13. The method of claim 12, wherein:
in the radiating of the laser,
a scattering alloy layer in which a melted portion of the electrical steel sheet by the radiation of the laser scatters and is resolidified is generated.

14. The method of claim 13, wherein:
a thickness of the scattering alloy layer is 4% to 12% of a depth of the groove.

15. The method of claim 14, wherein:
in the radiating of the laser,
the laser is radiated diagonally with respect to a width direction of the electrical steel sheet.

16. The method of claim 15, wherein:
in the radiating of the laser,
the laser is radiated at an angle greater than 0° and equal to or smaller than 5° with respect to the width direction of the electrical steel sheet.

17. The method of claim 16, wherein:
in the radiating of the laser,
three to six grooves are intermittently formed in the width direction of the electrical steel sheet.

* * * * *